United States Patent Office 3,715,394
Patented Feb. 6, 1973

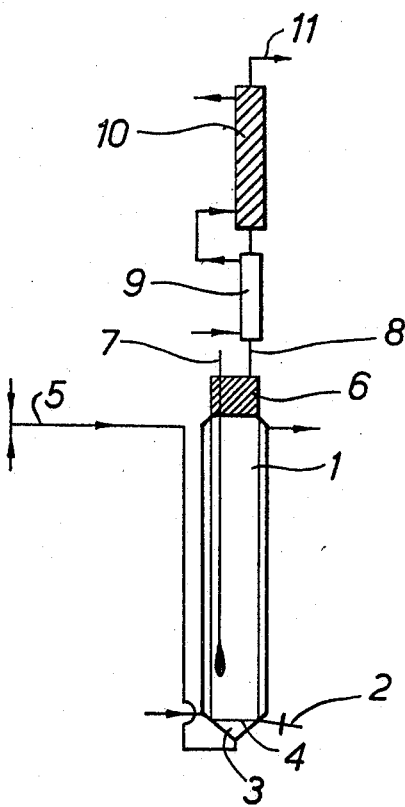

3,715,394
PROCESS FOR THE PREPARATION
OF LACTIC ACID
Jacques Boichard, Bernard Pierre Brossard, Michel Louis Marie Joseph Gay, and Raymond Marc Clement Janin, Lyon, France, assignors to Rhone-Poulenc S.A., Paris, France
Filed Nov. 25, 1966, Ser. No. 597,079
Claims priority, application France, Dec. 1, 1965, 40,514
Int. Cl. C07c 59/08
U.S. Cl. 260—535 R       14 Claims

ABSTRACT OF THE DISCLOSURE

Lactic acid is made by oxidizing propylene with nitric acid and/or nitrogen peroxide and hydrolysing the product with water.

---

This invention relates to the preparation of lactic acid from propylene.

Lactic acid can be prepared by fermentation of carbohydrates with microorganisms. The carbohydrates most commonly employed for this purpose are sugar molasses or hydrolysis products of starch. During the fermentation, there are formed, in addition to lactic acid, a large number of by-products which are often difficult to separate from the desired product and which necessitate costly purifying operations. Since lactic acid is employed to a large extent in the foodstuffs and pharmaceutical industries, and these uses require lactic acid of very high purity, the lactic acid must either be prepared from particularly pure carbohydrates such as refined sugar or be extensively purified before use.

Attempts have been made to synthesise lactic acid in order to avoid the disadvantages inherent in the fermentation process. Thus, it has been proposed to prepare lactic acid by reaction of acetaldehyde and carbon monoxide under pressure [see Peckham, Chem. Eng. News 22, 440 (1944)] or by hydrolysis of α-chloropropionic acid. It has also been proposed (see U.S. Pat. No. 2,847,464) to prepare lactic acid by oxidising propylene either with nitrogen peroxide ($N_2O_4$), nitrous anhydride ($N_2O_3$), or a mixture thereof, and then with nitric acid to complete the oxidation, or simultaneously with $N_2O_4$ and/or $N_2O_3$ and nitric acid. The product of oxidation freed from excess of nitrogen oxides and/or nitric acid by distillation is then subjected to an alkaline hydrolysis at elevated temperature. Under these conditions, the lactic acid yield does not exceed 27.8% based on the propylene employed.

A new process has now been found by which it is possible to prepare lactic acid in excellent yields from products of oxidation of propylene with nitrogen peroxide and/or nitric acid. This process consists in hydrolysing the products of oxidation of propylene with nitrogen peroxide and/or nitric acid, at elevated temperature with water using at least 5 mol. of water per mol. of oxidized propylene. The nitric acid always present in the product of oxidation, regardless of its mode of preparation, may optionally be eliminated or neutralised either wholly or partly before or after the addition of the water, but before the heating.

It was unexpected that the product of oxidation which consists mainly of α-nitratopropionic acid and contains a little lactic acid, would give good yields of lactic acid when hydrolysed with water, because the nitrate of α-hydroxyisobutyric acid which is the main constituent of the products of oxidation of isobutylene by $N_2O_4$ or by a mixture of $N_2O_4$ and $HNO_3$, leads to similar yields of α-hydroxyisobutyric acid whether the hydrolysis be carried out by water alone or by water in the presence of an alkaline base (cf. U.S. Pat. Nos. 2,971,981, 2,847,453, and 2,847,465 and Russian Pat. No. 143,388). Since the alkaline hydrolysis of α-nitratopropionic acid gives low lactic acid yields, as is shown by U.S. Pat. No. 2,847,464, it was to be expected that the same would be the case with hydrolysis by water alone. Moreover, S. Fumazoni et al. (La Chimica e l'Industria 47 (10) 1064 to 1067 (1965)) have reported that lactic acid is decomposed in the presence of strong mineral acids, especially at elevated temperatures. Now, the hydrolysis of α-nitratopropionic acid with water liberates nitric acid, the concentration of which increases as the reaction proceeds. It might therefore have been feared that, even with starting materials freed from nitric acid, and a fortiori with oxidation products containing nitric acid, such a hydrolysis would give only degradation products of lactic acid.

The starting material, which consists mainly of α-nitratopropionic acid and which in the following will be referred to as the "oxidation product" or "product of oxidation," may be obtained by oxidation of propylene (a) with nitrogen peroxide ($N_2O_4$), optionally in the presence of oxygen, or (b) with a solution of nitrogen peroxide in nitric acid, or (c) successively first with nitrogen peroxide and then with nitric acid, or (d) with nitric acid alone.

When propylene is oxidised with nitrogen peroxide with or without nitric acid or successively with nitrogen peroxide and nitric acid, at least 1.5 mol. of $N_2O_4$ per mol. of propylene is employed, preferably 2 mol. per mol. of propylene. The nitric acid, which may be employed at the same time or complementarily, is used as an aqueous solution, the procedure being such that there is constantly present in the medium an $HNO_3$ concentration at least equal to 25%, and preferably above 50%, throughout the duration of the reaction.

If the propylene is treated solely with nitric acid, it is desirable to employ at least 3 mol. of $HNO_3$ per mol. of propylene, the procedure also being such that the $HNO_3$ concentration in the reaction medium is preferably at least equal to 50%.

The nitric acid concentration of the reaction medium, which is expressed in the present specification as a percentage by weight, may be maintained in the appropriate concentration region by various procedures. For example, the acid may be replaced as it is consumed by additions of fresh nitric acid, or additions of fresh nitric acid associated with a recycling of nitric acid produced by recovery of the nitrous vapours formed in the course of the reaction. It is also possible to proceed by stopping the introduction of propylene before the nitric acid concentration in the medium falls below the chosen limit value.

Regardless of the oxidising agent chosen, there may be passed through the reaction mass a current of molecular oxygen or of a gas containing it, such as air, so as to convert the simultaneously formed nitric oxide (NO) into nitrogen peroxide in situ. The quantity of oxygen employed is determined by the quantity of nitric oxide (NO) formed, which itself varies in accordance with the general reaction conditions.

The temperature to which it is desirable to bring the reactants in the oxidation of the propylene varies with the adopted procedure. When oxidation is effected with nitrogen peroxide alone, the temperature must be between −10° and 30° C., and preferably between 0° and 20° C. With oxidation by a mixture of $N_2O_4$ and $HNO_3$, or when oxidation is effected by $HNO_3$ alone the temperature may be below or equal to 40° C. When nitric acid is employed as the only oxidising agent, the temperature is preferably between 0° and 25° C.

It is to be noted that during the reaction of the nitrogen peroxide with the α-olefines leading to nitrates of α- hydroxycarboxylic acids, unstable products may be formed. There is therefore a risk that uncontrollable decompositions and even explosions may occur in certain cases.

In the hydrolysis stage, which constitutes the subject of the present invention, the quantity of water employed must be at least 5 mol., and preferably at least 10 mol., per mol. of oxidised propylene. The mole ratio of water to propylene has no critical maximum value. Obviously, in choosing it, due regard is had to the problem of subsequently recovering the lactic acid produced.

Regardless of the mode of oxidising the propylene, the product obtained, which consists mainly of α-nitratopropionic acid, contains a variable quantity of nitric acid. This nitric acid may optionally be completely eliminated from the oxidation product before the hydrolysis, but it is preferably left, at least in a certain proportion, because it has been found that the presence of nitric acid in the hydrolysis medium ensures a rapid start to the hydrolysis reaction and thus makes it possible to reduce the duration of the reaction necessary for producing good yields. The initial nitric acid concentration in the hydrolysis medium, which consists of oxidation product and the adequate quantity of water, may vary within fairly wide limits, which may readily be determined as a function of the conditions of the hydrolysis reaction and more specifically in accordance with the temperature chosen, taking into account the fact that the simultaneous use of high temperature and of very high initial nitric acid concentration may cause a considerable oxidation of the α-nitratopropionic acid. Generally speaking, it is desirable to operate with initial nitric acid concentrations below 25%, and preferably below 10%, the initial nitric acid concentration being expressed as the weight of 100% nitric acid contained in 100 g. of the mixture of oxidation products, water and nitric acid employed in the hydrolysis. When the quantity of nitric acid in the oxidation product is such that the resultant initial nitric acid concentration in the hydrolysis medium is too high for the hydrolysis conditions chosen, the excess of nitric acid may be eliminated from the oxidation product by simple distillation (more particularly in the case of the product of oxidation of propylene with nitrogen peroxide) or by neutralisation by the usual methods.

The temperature at which it is desirable to carry out the hydrolysis reaction depends upon the initial nitric acid concentration. The operation is preferably carried out between 95° and 100° C. under normal pressure for initial nitric acid concentrations up to 3%. It is possible to lower this temperature to about 70° C., but it is then necessary to operate with higher initial nitric acid concentrations which may range up to about 25%, and the subsequent recovery of the lactic acid may be complicated; on the other hand, the yields obtained under these conditions are lower than those obtained at higher temperature with relatively low initial nitric acid concentrations.

The use of temperatures below 95–100° C. results in reaction durations which are incompatible with the industrial application of the process when low initial nitric acid concentrations are employed. On the other hand, the use of temperatures above 100° C., which may be obtained by working under pressure, greatly increases the speed of hydrolysis.

It has been found that in the course of the hydrolysis of the oxidation product, various oxygenated nitrogen compounds having a degree of oxidation ranging from 2 to 4, such as NO and nitrous acid, are formed, the presence of which causes secondary reactions which result in a substantial lowering of the lactic acid yield, and that it is advantageous either to eliminate them from the hydrolysis medium or to convert them into products having no deleterious effect under the operating conditions.

When the hydrolysis is carried out under atmospheric pressure, the elimination of the oxygenated nitrogen compounds may be effected by any means which brings about a lowering of the vapour pressure of these compounds above the reaction mass, for example by suction with a vacuum pump or by displacement of the gas phase by an inert gas or oxygen or a mixture of the two, e.g. air. The displacement may be effected by the admission of the flushing gas either directly into the gas phase or after passage through the liquid phase. When oxygen or air is passed through the liquid phase, a conversion of some of the nitrogen oxides into $HNO_3$ simultaneously occurs.

When the hydrolysis reaction is carried out under pressure, it is possible either to operate in the presence of oxygen or of an oxygen-containing gas to effect the oxidation of the oxygenated nitrogen compounds as they are formed, or to effect an elimination of these compounds by continual degassing during the reaction.

When flushing with a gas is carried out, the conditions under which this gas is introduced are chosen in accordance with the various parameters of the hydrolysis reaction in order to ensure that the nitrogen oxides are as completely eliminated as possible. The optimum rate of introduction of the gas may be readily found by simple tests for each particular case.

In practice, to prepare the oxidation product, a current of propylene, and optionally oxygen also, is passed through the liquid oxidant maintained at adequate temperature. The rate of flow of the propylene depends upon a number of factors and more particularly upon the apparatus, which must ensure that the gas is as divided as highly as possible within the liquid. This rate of flow is experimentally determined and is so adjusted as to avoid the presence of propylene in the effluent gases of the reaction, or at least to limit the propylene content of these gases to a minimum value. When oxygen is employed, its rate of flow must be adjusted as a function of that of the propylene in order to maintain the molecular ratio of oxygen to propylene at a value at least equal to ¼.

The reaction mass obtained is treated in two different ways, depending upon the mode of oxidation chosen. In the case of an oxidation product produced by $N_2O_4$ alone, this oxidation product is degassed by flushing with an inert gas (nitrogen) or with oxygen (which simultaneously ensures the reoxidation of the recoverable nitrogen oxides), whereafter the remaining $N_2O_4$ is eliminated by distillation under reduced pressure and recovered for a subsequent operation. In this case, the quantity of nitric acid contained in the oxidation product is generally sufficient to ensure a rapid starting of the hydrolysis. It is then sufficient to add the appropriate quantity of water and to heat the mixture.

In the case of an oxidation product produced by successive action of $N_2O_4$ and then $HNO_3$, the nitric acid being added to the reaction mass with or without previous elimination of the excess of $N_2O_4$, and also in the case of an oxidation product produced by a mixture of $N_2O_4$ and $HNO_3$ in a single stage, the elimination of the excess of oxidising mixture may be carried out either by distillation in vacuo or by first driving off the excess of $N_2O_4$ under reduced pressure and thereafter neutralising the greater part of the $HNO_3$ by adding an alkaline agent before or after the addition of the water necessary for the hydrolysis. The hydrolysis is then carried out by heating at the chosen temperature as previously indicated.

The length of time required for the hydrolysis naturally depends on the temperature and the composition of the reaction mixture, especially the initial concentration of nitric acid. The course of the hydrolysis may readily be followed by determining the quantity of lactic acid and/or nitric acid in the reaction mixture. When either of these reaches a maximum the hydrolysis is complete. Generally this takes from 3 to 20 hours.

By this procedure, lactic acid is obtained in yields higher than 50%. The lactic acid obtained is recovered by known means, for example by precipitation of the calcium lactate or by extraction with a solvent (for example diisopropyl ether).

The reactants and the operating conditions of the process according to the invention lend themselves particularly well to a continuous performance of the process.

The following examples illustrate the invention.

EXAMPLE 1

The apparatus employed is illustrated in the accompanying drawing. It comprises the following elements: a cyclindrical glass reactor 1 having a height of 200 mm., a diameter of 40 mm. and a useful volume of 250 cc., which is equipped with a double jacket, and a drain cock 2 at its base; a conical chamber 3 connected to the lower part of the reactor and separated therefrom by a plate 4 of sintered glass No. 2 (mean pore diameter between 40 and 90$\mu$); a pipe 5 for the supply of propylene or nitrogen, connected to the apex of the conical chamber, rising laterally along the outside wall of the reactor and adapted to be connected to a propylene or nitrogen source; a reactor head consisting of a ground-glass stopper 6 provided with a thermometer tube 7 and a pipe 8 connected to a straight reflux condenser 9 itself surmounted by a coil-type condenser 10 supplied with a current of acetone cooled to $-15°$ C. by solid carbon dioxide and intended to condense part of the nitrous vapours coming from the reactor. In the double jacket of the reactor, acetone cooled to maintain the reaction mixture at the desired temperature is also circulated. The effluent gases are conducted through the pipe 11 to a device (not shown in the figure) comprising two absorbers (containing 30%-by-weight aqueous hydrogen peroxide) intended to absorb the remainder of the nitrous vapours, and then an Orsat device for measuring unconverted propylene by absorption in concentrated sulphuric acid.

Before operation is commenced, the temperature of the acetone circulating through the double jacket of the reactor is adjusted to between 4° and 6° C. and then, while a moderate current of nitrogen is passed through the reactor to prevent any admission of liquid into the chamber 3, a solution of 45.5 g. of nitrogen peroxide in 240.1 g. of 70%-by-weight nitric acid (i.e. a nitrogen peroxide concentration of 16%) is charged into the reactor). The current of nitrogen is stopped and propylene is introduced at a rate of 1.89 litres per hour (measured at 0° C. and 760 mm. Hg). The temperature of the acetone flowing through the double jacket is maintained between $+4°$ and $+6°$ C., and it is then possible to maintain the temperature in the reaction medium between 7.5° and 8° C.

The injection of propylene lasts 3 hours 30 minutes which corresponds to a total charge of 12.4 g. of propylene (0.296 mol.). No trace of propylene is observed in the effluent gases. The current of propylene is replaced by a light current of nitrogen, and the reaction mass is left for 10 minutes at a temperature between 0° and 5° C. and then drained from the reactor. The rate of flow of nitrogen is brought to 10 litres per hour for several minutes in order to degas the apparatus and to recover the nitrous vapours. 0.143 mol. of nitric acid and/or nitrogen peroxide are recovered in the hydrogen peroxide absorbers. The reaction mass weighs 282 g. By degassing the latter at ambient temperature, under a pressure of 20 mm. Hg, 0.99 mol. of a nitrogen peroxide/nitric acid mixture is recovered.

The degassed reaction mixture weights 236.4 g. 615 g. of water and sodium carbonate until the pH reaches 1, are then added, and the nitric acid concentration is thus brought to about 0.6%. The mixture is then heated for 20 hours at 100° C. under atmospheric pressure. The solution obtained is continuously extracted with diisopropyl ether. After evaporation of the diisopropyl ether from the extract, the residue is found to contain 0.146 mol. of lactic acid and 0.037 mol. of lactyllactic acid, i.e. a total of 0.220 mol. expressed as lactic acid. The lactic acid yield based on the propylene introduced is 74.3%.

EXAMPLE 2

The apparatus described in Example 1 was replaced by a similar apparatus having the following characteristics: height of the reactor, 235 mm.; diameter, 27 mm.; useful volume, 140 cc.; and a plate of sintered glass No. 3 (mean pore diameter between 15 and 40$\mu$).

Before the operation is commenced, the temperature of the acetone flowing through the double jacket of the reactor is adjusted to between 0° and $-5°$ C. and then, while a light current of oxygen is admitted into the reactor to prevent any entry of liquid into the chamber 3, 88.1 g. of nitrogen peroxide (i.e. 1.915 mol. of $NO_2$) previously maintained in the liquid state at 0° C. are charged to the reactor. Propylene is then introduced at a rate of 2.6 litres per hour (measured at 0° C. and 760 mm. Hg), in admixture with the oxygen, the rate of flow of which is 4.6 litres per hour (also measured at 0° C. and 760 mm. Hg). The temperature of the acetone flowing through the double jacket is lowered to a temperature between $-8$ and $-11°$ C. so as to maintain a temperature of 0° to 3° C. in the reaction mixture.

The current of propylene is stopped after 6 hours 40 minutes, during which time 32.6 g. of propylene (0.776 mol.) has been passed. No trace of propylene is observed in the effluent gases. The rate of oxygen flow is reduced to below 1 litre per hour. The reaction mass is left for 15 minutes at a temperature between 0° and $-5°$ C. and then drained from the reactor through the cock 2. The rate of oxygen flow is brought to 10 litres per hour for 30 minutes to degas the apparatus and to ensure recovery of the nitrous vapours. 8.5 g. of nitrogen peroxide (i.e. 0.185 mol. of $NO_2$) are recovered in the hydrogen peroxide absorbers. The weight of the reaction mass is 135.9 g.

By degassing of the reaction mass at ambient temperature under a pressure of 20 mm. Hg, 30.5 g. of nitrogen peroxide (i.e. 0.663 mol. of $NO_2$) are collected. 104 g. of pale yellow liquid mainly consisting of $\alpha$-nitratopropionic acid are obtained. Each 100 g. of liquid contains 0.756 mol. of acidity, 0.733 nitrogen atom (by Dewarda's method), and 0.041 mol. of lactic acid.

To the degassed liquid thus obtained 520 g. of water are added and the mixture thus obtained, the initial nitric acid concentration of which is about 1.2% by weight, is heated for 15 hours at 100° C. under atmospheric pressure. After hydrolysis the solution contains 0.594 mol. of lactic acid.

The total balance of the reaction is a follows: lactic acid yield based on propylene introduced 77%; nitrogen peroxide used, expressed in mol. of $NO_2$ per mol. of propylene introduced, 1.37 mol./mol.

EXAMPLE 3

The oxidation is carried out as in Example 2. 450 g. of water are then added to the pale yellow liquid (104 g.) obtained after degassing the oxidation product, and the whole is brought to 120° C., under the autogenous pressure of the reactants, in a pressure-resistant apparatus provided with an expansion valve adjusted to maintain a pressure of 4 bars. The duration of the heating is 5 hours.

After extraction of the solutions with diisopropyl ether and evaporation of the latter, a residue containing 0.588 mol. of lactic acid is obtained, i.e. a yield of 76% based on the propylene introduced.

EXAMPLE 4

The apparatus employed in Example 2 was modified by fitting a thermometer tube in the lower third of the reactor at an inclination of 45° and by adding to the ground-glass head a pipe the top of which is connected to a 100 cc. dropping funnel having a double jacket, through which is circulated a current of acetone cooled to $-15°$ C. by solid carbon dioxide, and the bottom of which extending to the bottom of the reactor.

8.9 g. of nitrogen peroxide (i.e. 0.194 mol. of $NO_2$) are dissolved in 39.2 g. of the pale yellow liquid oxidation product of Example 2 (consisting mainly of α-nitratopropionic acid) to give a nitrogen peroxide concentration in the mixture of 18.5%, and the whole is then introduced into the reactor. Propylene is introduced at a rate of 3.86 litres per hour (measured at 0° C. and 760 mm. Hg) mixed with oxygen at a rate of flow of 7.5 litres per hour (also measured at 0° C. and 760 mm. Hg). Simultaneously, 17.6 to 17.7 g. per hour of nitrogen peroxide are regularly added to the reactor through the dropping funnel. In 3 hours of reaction at a temperature of Example 1, 53 g. of nitrogen peroxide (i.e. 1.15 mol. of $NO_2$) and 0.512 mol. of propylene are added.

0.035 mol. of propylene is found in the effluent gases. The extent of conversion is therefore equal to 93%. After working up as in Example 2 (with addition of 520 g. of water), the yield of lactic acid based on converted propylene is 0.477 mol. (79.7%), and the amount of nitrogen peroxide used, expressed in mol. of $NO_2$ per mol. of converted propylene, is 1.65 mol./mol.

EXAMPLE 5

The apparatus employed is that described in Example 1, which is modified in that the pipe 8 is replaced by a Y-tube connected on the one hand to the condensers 9 and 10 and on the other to a 100 cc. dropping funnel.

Before the operation is begun, the temperature of the acetone flowing through the double jacket is adjusted to between 6° and 8° C. By proceeding as in Example 1, 311.1 g. of 60%-by-weight nitric acid are introduced, and propylene is then admitted at a rate of 1.83 litres per hour (measured at 0° C. and 760 mm. Hg). The temperature in the reaction mass is 10° C. Propylene is passed in for 5 hours, which corresponds to a total of 17.2 g. of propylene (0.409 mol.). Simultaneously, a total of 74 g. of nitric acid (96.2% by weight) is regularly and continuously introduced into the reactor. 0.023 mol. of unconverted propylene is contained in the effluent gases. The extent of conversion is thus 94.4%.

When the passage of propylene has been stopped, it is replaced by a light current of nitrogen and the reaction mass is maintained at 10° C. for 1 hour and then cooled to 0° C. and drained. The rate of nitrogen flow in the empty apparatus is brought to 10 litres per hour in order to recover the nitrous vapours completely. 0.157 mol. of nitric acid are collected in the hydrogen peroxide absorbers. The weight of the reaction mass is 390.1 g. and its nitric acid concentration is 57.5%. The nitrous vapours are eliminated therefrom at ambient temperature under a reduced pressure of 20 mm. Hg, which results in a loss of weight of the reaction mass of 25.4 g.

To the degassed reaction mixture thus obtained 300 g. of water are added followed by sodium carbonate to a pH of 1, and the nitric acid concentration of the mixture is thus brought to about 0.6%. The whole is then heated at 100° C. for 20 hours under atmospheric pressure. The aqueous solution obtained is continuously extracted with di-isopropyl ether. After evaporation of the latter, the residue contains 0.285 mol. of lactic acid. The yield is thus 73.8%, based on the converted propylene.

EXAMPLE 6

The reaction is carried out as in Example 5 under the following conditions and with the following results:

| | |
|---|---:|
| Initial nitric acid concentration _____percent__ | 40 |
| Quantity of nitric acid introduced at the start g__ | 310.9 |
| Rate of propylene flow (measured at 0° C. and 760 mm. Hg _____(litres/hour)__ | 1.84 |
| Duration of the intrduction of propylene hours__ | 5 |
| Quantity of propylene introduced (0.412 MoPo) g__ | 17.3 |
| Quantity of 96% nitric acid added during the reaction _____g__ | 50.9 |
| Oxidation temperature _____° C.__ | 10 |
| Final nitric acid concentrtaion in the product of oxidation _____percent__ | 40.7 |
| Quantity of propylene in the effluent gases mol__ | 0.215 |
| Extent of conversion of the propylene __percent__ | 47.8 |
| Nitric acid collected in the hydrogen peroxide absorbers _____mol__ | 0.065 |
| Weight of the reaction mass _____g__ | 361.9 |
| Weight of nitrous vapours recovered by degrassing the reaction mass _____g__ | 3.4 |
| Weight of water added _____g__ | 300 |
| Nitric acid concentration of the mixture of oxidation product and water after partial neutralisation _____percent__ | 0.6 |
| Duration of the hydrolysis _____hours__ | 20 |
| Temperature of the hydrolysis _____° C.__ | 100 |
| Lactic acid obtained _____mol__ | 0.0925 |
| Lactiu acid yielded based on converted propylene percent__ | 46.9 |

EXAMPLE 7

By following the procedure of Example 5, but changing various factors of the oxidation reaction, a series of tests were carried out under the conditions set out in the following table (the hydrolysis of the oxidation product was carried out in the same way as in Example 5).

TABLE

| Test | Duration of oxidation | Temp. (° C.) | Propylene | | | HNO₃ | | | | Product of the oxidation reaction | | Lactic acid yield based on converted propylene (percent) |
|---|---|---|---|---|---|---|---|---|---|---|---|---|
| | | | Rate of supply (litres per hour)¹ | Consumed (millimol.) | Extent of conversion (percent) | Introduced at the beginning of the test | | Introduced in the course of the test | | Concentration of HNO₃ (percent) | Total weight (g.) | |
| | | | | | | Concentration (percent) | Weight (g.) | Concentration (percent) | Weight (g.) | | | |
| A | 4 hrs. 10 min | 10 | 1.71 | 315 | 100 | 82 | 304.5 | | Nil | 76.3 | 312.4 | 77.2 |
| B | 5 hrs. 10 min | 10 | 1.85 | 424 | 99.3 | 71.8 | 308 | 96.2 | 121.3 | 71.3 | 434.1 | 73.8 |
| C | 5 hrs | 10 | 1.82 | 350 | 86 | 50.1 | 309.4 | 96.2 | 66.9 | 50.7 | 378.9 | 57 |
| D | 5 hrs | 25 | 1.90 | 236 | 55.5 | 39.7 | 312.1 | 96.2 | 50.9 | 40.2 | 363.2 | 50 |
| E | 14 hrs 40 min | 10 | 2.16 | 894 | 63.1 | 60.2 | 311.3 | | Nil | 36.7 | 319 | 47 |

¹ Measured at normal temperature and pressure.

EXAMPLE 8

By proceeding as in Example 2, 103.4 g. of a product of oxidation of propylene with nitrogen peroxide are prepared, consisting mainly of α-nitratopropionic acid. 100 g. of this liquid product contains 0.772 mol. of acidity, and 0.718 atom of nitrogen (measured by Dewarda's method). 16.1 g. of this product are hydrolysed by heating at 100° C. after the addition of 81 g. of distilled water. Simultaneously, a weak current of oxygen is bubbled into the reaction mass. After reaction for 15 hours, the hydrolysis medium contains 0.096 mol. of lactic acid which corresponds to a yield of 83% based on the propylene employed in the prepartion of the α-nitratopropionic acid.

When this test is repeated without passing a current of oxygen into the reaction mixture, the yield is only 80%.

EXAMPLE 9

50 g. of water and 9.9 g. of a product of oxidation of propylene identical to that employed in Example 8 are introduced into a 125 cc. stainless-steel autoclave. The apparatus is sealed and oxygen is then introduced to an absolute pressure of 21 bars. The contents of the autoclave are then brought to 120° C. with stirring. These conditions are maintained for 5 hours, and the apparatus is then degassed after cooling to ambient temperature. The pressure in the apparatus before degassing is 17 bars absolute. 58.3 millimol. of lactic acid are contained in the reaction mixture, i.e. a yield of 82% based on the propylene employed in the preparation of the α-nitratopropionic acid.

EXAMPLE 10

Into a 100 cc. round-bottomed flask provided with a ball-type condenser, a magnetic stirring device and an adjustable-temperature oil-bath, 9.23 g. of the crude product of oxidation of propylene obtained by the procedure described in Example 1 are introduced. 46 g. of water and sodium carbonate to a final pH of 1 are then introduced into the flask. The nitric acid concentration of the medium is then 0.7%. The temperature of the oil-bath is brought to 100° C. and the contents of the flask are maintained at this temperature. Periodic test samples are taken to measure the unconverted α-nitratopropionic acid and nitric acid concentration of the medium as a function of time. This experiment is repeated on hydrolysis media having initial $HNO_3$ concentrations of 0%, 1.76% and 2.55%, respectively. The results obtained are set out in the following table:

TABLE

| Initial nitric acid concentration | Extent of conversion of α-nitratopropionic acid (percent) | | | | Nitric acid concentration in the reaction solution (percent) | | | |
|---|---|---|---|---|---|---|---|---|
| | A 0% | B 0.7% | C 1.86% | D 3.55% | A 0% | B 0.7% | C 1.76% | D 2.55% |
| Time, hours: | | | | | | | | |
| 0 | 0 | 0 | 0 | 0 | 0 | 0.7 | 1.76 | 2.55 |
| 1 | 8 | 12 | 12.2 | 27 | 0 | 0.86 | 2.16 | 3.49 |
| 2 | 11 | 16 | 27.2 | 47.2 | 0.11 | 1.03 | 2.52 | 4.53 |
| 3.5 | | 27.1 | 44.2 | 70.2 | 0.32 | 1.42 | 3.50 | 6.33 |
| 4.5 | | | 58.5 | 85.7 | | | 4.47 | 7.21 |
| 5 | | 37.5 | | | | 2.09 | | 7.63 |
| 5.5 | 37.5 | | 74.8 | 91.9 | 1.05 | | 5.5 | |
| 6.5 | 38 | 53.5 | | | 1.55 | 3.05 | | |
| 7 | | | 87 | 94.9 | | | 6.46 | 7.97 |
| 7.5 | 55 | | | | 2.05 | | | |

The yield of lactic acid based on the propylene is 84.6% after hydrolysis for 7 hours in test D.

EXAMPLE 11

The various tests of Example 10 are repeated under the following conditions: a hydrolysis temperature of 70° C.; an initial nitric acid concentration in test A of 13.6%, test B of 19%, and test C of 22.9%. The results obtained are set out in the following table:

| | Extent of conversion of α-nitratopropionic acid (percent) | | | Lactic acid yield (percent) based on propylene consumed | | | Nitric acid concentration of the medium (percent) | | |
|---|---|---|---|---|---|---|---|---|---|
| Test | A | B | C | A | B | C | A | B | C |
| Time, hours: | | | | | | | | | |
| 0 | 0 | 0 | 0 | 0 | 0 | 0 | 13.6 | 19 | 22.9 |
| 2 | 30.3 | 60.3 | 65.8 | | | 55.4 | 14.5 | 21.4 | 25.1 |
| 4 | 43 | 79.5 | 92 | 33 | 62.8 | 66.2 | 15.3 | 22.2 | 25.6 |
| 6 | | 90.5 | 100 | | | 67.7 | | 22.2 | 25.6 |
| 8 | 69.7 | 98.5 | 100 | 65 | 69.5 | 61.5 | 16.8 | 22.5 | 25.1 |

We claim:

1. In a process for the preparation of lactic acid by oxidation of propylene with nitrogen peroxide or nitric acid or both, hydrolysis of the product and separation of the lactic acid, the improvement which consists in effecting the hydrolysis with a medium consisting essentially of water or water containing nitric acid using at least 5 mols of water per mol of oxidised propylene and during the hydrolysis eliminating from the hydrolysis medium at least some of the oxygenated nitrogen compounds having a degree of oxidation of 2 to 4 which are formed during the hydrolysis or converting at least some of said oxygenated nitrogen compounds during the hydrolysis into products having no deleterious effect under the operating conditions on lactic acid yield.

2. The improvement according to claim 1, in which the hydrolysis is effected on the product of oxidation of propylene with either nitrogen peroxide alone or nitrogen peroxide and nitric acid.

3. The improvement according to claim 1, in which the hydrolysis is effected on the product of oxidation of propylene with nitric acid alone.

4. The improvement according to claim 1, in which the nitric acid concentration in mixture obtained after addition of water to the said product of oxidation is adjusted to at most 25% by weight before the hydrolysis is effected.

5. The improvement according to claim 4, in which the said concentration is adjusted to below 10% by weight.

6. The improvement according to claim 1, in which the hydrolysis is effected at 95° to 100° C. and at atmospheric pressure.

7. The improvement according to claim 1, in which oxides of nitrogen are at least partially removed from the reaction mixture during the hydrolysis by passing an inert gas, or oxygen, or a mixture of the two, over or through the said reaction mixture.

8. The improvement according to claim 1 in which the hydrolysis is effected under super atmospheric pressure in the presence of oxygen.

9. The improvement according to claim 1 in which the hydrolysis is effected under super atmospheric pressure with continual degassing of the reaction mixture.

10. The improvement according to claim 7 in which the hydrolysis is effected at atmospheric pressure.

11. The improvement according to claim 1 in which the hydrolysis is effected at super atmospheric pressure at a temperature above 100° C.

12. The improvement according to claim 1 in which the hydrolysis is effected in a medium containing at least 0.6% by weight nitric acid.

13. The improvement according to claim 1 in which the nitric acid present in the oxidation product to be submitted to hydrolysis is removed or neutralised ether partially or completely before hydrolysis is effected.

14. The improvement according to claim 1 in which the hydrolysis is effected at 70 to 120° C.

References Cited

UNITED STATES PATENTS

| | | | |
|---|---|---|---|
| 2,847,453 | 8/1958 | Gardner et al. | 260—535 X |
| 2,847,464 | 8/1958 | Robertson et al. | 260—533 |
| 2,847,465 | 8/1958 | Robertson et al. | 260—533 |

LORRAINE A. WEINBERGER, Primary Examiner

P. J. KILLOS, Assistant Examiner

U.S. Cl. X.R.

260—533 R

UNITED STATES PATENT OFFICE
CERTIFICATE OF CORRECTION

Patent No. 3,715,394              Dated February 6, 1973

Inventor(s) Jacques Boichard, Bernard Pierre Brossard, Michel Louis Marie Joseph Gay and Raymond Marc Clement Janin It is certified that error appears in the above-identified patent and that said Letters Patent are hereby corrected as shown below:

In the heading, after "Claims priority, application France, Dec. 1, 1965, 40,541" insert --Feb. 4, 1966, 48,523 and May 11, 1966, 61,182--.

Signed and sealed this 18th day of December 1973.

(SEAL)
Attest:

EDWARD M. FLETCHER, JR.　　　　RENE D. TEGTMEYER
Attesting Officer　　　　　　　　Acting Commissioner of Patents